Sept. 27, 1966 R. C. BEDINGFIELD 3,275,851
TRAPEZOIDAL TEST SIGNAL GENERATOR WITH
LEADING AND TRAILING EDGE CONTROL
Filed Feb. 18, 1964

INVENTOR
R. C. BEDINGFIELD
BY
[signature]
ATTORNEY

United States Patent Office 3,275,851

Patented Sept. 27, 1966

3,275,851

TRAPEZOIDAL TEST SIGNAL GENERATOR WITH LEADING AND TRAILING EDGE CONTROL

Robert C. Bedingfield, Greensboro, N.C., assignor to Bell Telephone Laboratories, Incorporated, New York, N.Y., a corporation of New York Filed Feb. 18, 1964, Ser. No. 345,795

5 Claims. (Cl. 307—88.5)

Figure 1:
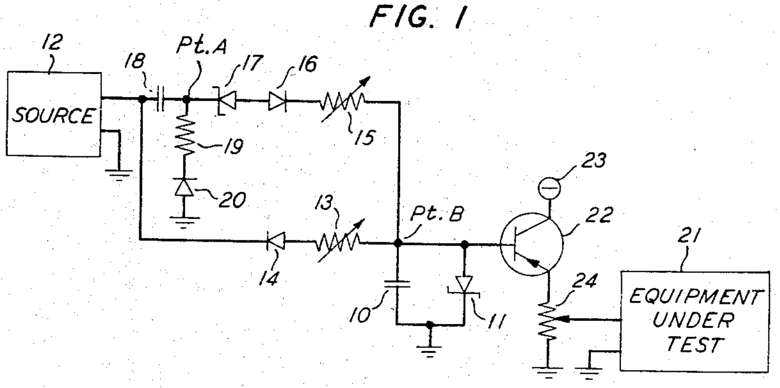

This invention relates to waveforming circuits and in particular to circuits for producing electrical signals having trapezoidal waveforms with leading and trailing edges whose slopes are substantially linear and independently adjustable.

In the electronic art it is often necessary to provide a source of test signals where the waveforms of the signals may be controllably adjusted in order to test the operation of a circuit. A frequently required test signal is one having a trapezoidal waveform where the slopes of the leading and trailing edges are substantially linear and independently adjustable. Although the prior art discloses circuits for generating such signals, these circuits have frequently been found to be more complex than desired.

An object of the present invention is to produce, by way of a relatively simple circuit arrangement and in response to signals having substantially vertical leading and trailing edges, signals having trapezoidal waveforms with substantially linear leading and trailing edges whose slopes are independently adjustable.

These and other objects of the invention are achieved by the invention in one of its broader forms by utilizing the energy in an input signal having vertical leading and trailing edges to cause a predetermined charge to be substantially linearly accumulated in and discharged from a capacitor. The linear accumulation of the predetermined charge begins with the leading vertical edge of the input signal and continues until the capacitor has received its predetermined charge. The rate of charge accumulation is controlled by a resistive element while the predetermined charge accumulated in the capacitor is determined by a voltage clamping device.

In accordance with a feature of the invention, a second capacitor is also charged by the input signal with the charge in the second capacitor being applied to the first-mentioned capacitor in response to the termination of the input signal. The first capacitor is thus discharged with the discharging rate determined by a second resistive element. Because the charge in and the voltage across the second capacitor is much greater than those of the first capacitor, the discharging of the first capacitor is also affected in a substantially linear manner. As a result of the controlled charging and discharging of the first capacitor, the voltage appearing across the first capacitor has a trapezoidal waveform with its leading and trailing edges having slopes which are substantially linear and adjustable.

In one embodiment of the invention a first capacitor and a Zener diode are connected in parallel with one terminal of the combination connected to a point of ground potential. The capacitor is charged in response to an input potential to a potential level limited by the Zener action of the diode. The charging path includes an adjustable current limiting resistor and a second diode connected in series. The resistor is adjustable so that the rate of charging is controllable while the second diode is poled to provide isolation in the absence of the input potential.

In this embodiment of the invention, a second capacitor having one terminal returned to a point of ground potential by a second current limiting resistor and a third diode connected in series is also charged by the input potential. While the input potential is present, the third diode is forward biased and the potential at the junction between the second capacitor and second resistor is relatively close to ground potential. When the input potential terminates, the third diode is reverse biased with the potential at this junction assuming a potential level approximating that of the previous input potential but of the opposite polarity.

The junction between the second capacitor and second resistor is connected to the ungrounded terminal of the first capacitor by a path comprising fourth and fifth diodes (the first of which is a Zener diode) and a third current limiting resistor connected in series. The fourth and fifth diodes provide isolation between the first and second capacitors during the time the input potential is present. Because the potential across and the charge in the second capacitor exceed those of the first capacitor and, furthermore, because the forward conducting voltage drop of the first Zener diode limits the level of the charge that can be placed on the first capacitor by the second capacitor, the rate of charge on the first capacitor during this portion of the cycle is substantially linear.

The potential appearing across the first capacitor of the above-described embodiment has a trapezoidal waveform with its leading and trailing edges having slopes which are substantially linear and adjustable by the first and second current limiting resistors, respectively. The potential appearing across this capacitor is made available as an output signal by way of a transistor emitter follower circuit.

Other objects and features of the invention will become apparent from a study of the following detailed description of a specific embodiment.

In the drawings:

FIG. 1 discloses a schematic diagram of one embodiment of the invention; and

Figures 2A, 2B, 2C:
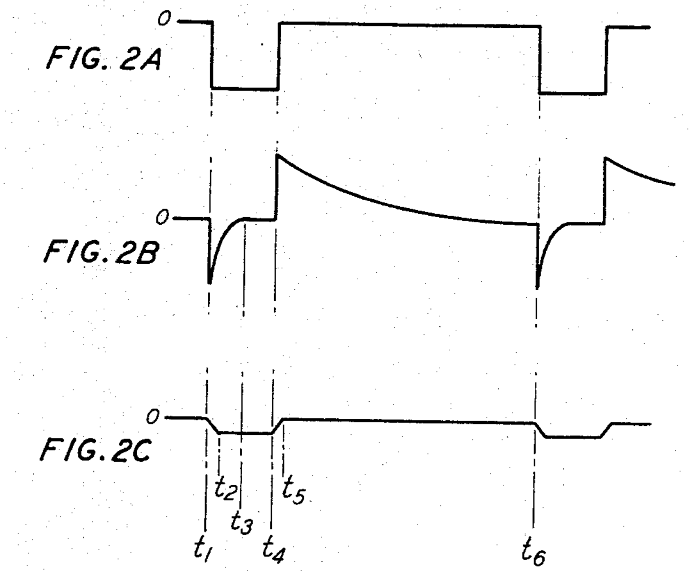

FIGS. 2A through 2C disclose waveforms of voltages appearing at various points within the embodiment depicted by FIG. 1.

The embodiment of FIG. 1 includes a capacitor 10 and a Zener diode 11 connected in parallel with one terminal of the parallel combination connected to a point of ground potential. Zener diode 11 is poled so that its Zener breakdown occurs when its ungrounded terminal is at a negative potential with respect to ground. The ungrounded terminal of the combination is connected to a source 12 by a charging path comprising an adjustable resistor 13 and a conventional diode 14 connected in series. Source 12 produces negative-going rectangularly-shaped output potentials. Diode 14 is poled for easy current flow from capacitor 10 to source 12.

A discharging path is also connected between the ungrounded terminal of capacitor 10 and source 12. The discharging path includes an adjustable resistor 15, a conventional diode 16, a Zener diode 17, and a capacitor 18, all connected in series in the path. As will become apparent from the following discussion, one terminal of capacitor 18 must be connected to source 12, while resistor 15 and diodes 16 and 17 may appear in any order. Diode 16, however, is poled for easy current flow from source 12 to capacitor 10 while diode 17 is poled so that its Zener breakdown effect is present when diode 16 is conducting. A series combination comprising a resistor 19 and a conventional diode 20 is connected between the terminal of capacitor 18 which is not connected to source 12 and a point of ground potential. Diode 20 is poled for easy current flow towards capacitor 18.

The signal developed across capacitor 10 is made available to equipment 21, which is under test, by way of a transistor emitter follower circuit. The emitter follower circuit comprises a PNP transistor 22 having its collector electrode connected to a negative terminal 23 of a source of direct current and a potentiometer 24 having its extreme terminals connected between the transistor emitter electrode and a point of ground potential. The arm terminal of potentiometer 24 is connected to equipment 21. The transistor base electrode is connected to the ungrounded terminal of capacitor 10.

The above-described embodiment is meant for use with negative-going input signals. As recognized by those skilled in the art, the embodiment may be made responsive to positive-going input signals by reversing all the diodes, replacing PNP transistor 22 with a NPN transistor, and applying a positive potential to the collector electrode of the transistor.

The operation of the embodiment illustrated by FIG. 1 is now presented in conjunction with FIGS. 2A through 2C.

FIG. 2A illustrates the waveform of the signal produced by source 12; FIG. 2B illustrates the waveform of the voltage between point A (that is, the junction between capacitor 18 and resistor 19) and ground; and FIG. 2C illustrates the waveform of the voltage developed between point B and ground (that is, across capacitor 10). The three waveforms are shown in time alignment so that the time scale shown in FIG. 2C also applies to FIGS. 2A and 2B.

Prior to time $t_1$ the potentials from source 12 and points A and B to ground are all substantially equal to zero. At time $t_1$ a negative-going voltage is applied by source 12. Diodes 14 and 20 are both forward biased as a result of this potential. The potential at point B begins to change from zero towards the level of the potential from source 12 as capacitor 10 accumulates a charge through resistor 13. At time $t_2$ the potential across capacitor 10 equals the breakdown voltage of Zener diode 11. When this occurs the diode conducts and the potential across the capacitor becomes clamped at the Zener diode breakdown level. Because Zener diode 11 clamps the voltage of capacitor 10 to a level in the order of one tenth of the potential from source 12, the charging of capacitor 10 occurs over the substantially linear portion of the RC time constant curve determined by resistor 13 and capacitor 10. As shown in FIG. 2C, therefore, the potential at point B to ground changes at a substantially linear rate between times $t_1$ and $t_2$. The rate of change or slope of the voltage may be changed by adjusting resistor 13.

At time $t_1$ the potential at point A immediately drops to approximately the level of the potential from source 12. Capacitor 18, however, rapidly accumulates a charge via resistor 19 and diode 20 so that at time $t_3$ the potential at point A is substantially at ground potential level.

It should be noted that from approximately time $t_3$ to time $t_4$ point B is more negative than point A. This potential difference is of a polarity nature to tend to forward bias diode 16. Zener diode 17, however, has a Zener breakdown voltage which is in excess of this potential difference, thereby preventing the conduction of diode 16.

At time $t_4$ the potential from source 12 is again equal to zero. Because of the charge on capacitor 10, point B is negative with respect to ground so that diode 14 is reverse biased.

In accordance with a feature of the invention, when the potential from source 12 is again equal to zero at time $t_4$, the charge on capacitor 18 causes point A to assume a positive potential level whose magnitude is approximately equal to the magnitude of the potential from source 12 between times $t_1$ and $t_4$. This causes diode 20 to be reverse biased. Because point A is at a positive potential level while point B is at a negative potential level, Zener diode 17 breaks down, diode 16 conducts, and capacitor 10 is discharged by the charge on capacitor 18. Zener diode 11 again performs as a clamp and clamps the potential across capacitor 10 to a substantially zero level. (Point B is actually slightly positive with respect to ground because of the drop across diode 11.) Capacitor 18 continues to discharge through diode 11. Because the potential and the charge on capacitor 18 exceed those of capacitor 10 by a factor in the order of ten, the discharging of capacitor 10 occurs over the substantially linear portion of the RC time constant curve determined primarily by resistor 15 and capacitor 10. The potential at point B, therefore, changes at a substantially linear rate between times $t_4$ and $t_5$. The rate of change or slope of this potential may be changed by adjusting resistor 15.

The above-described cycle repeats itself beginning at time $t_6$.

The invention has been described in detail with respect to a particular embodiment. It should be understood that various other embodiments may be devised by those skilled in the art without departing from the spirit and scope of the invention.

What is claimed is:

1. In combination a source for producing a voltage having a rectangular waveform with leading and trailing edges, first energy storage means responsive to said trailing edge of said rectangular voltage to produce a voltage having a polarity opposite to that of said source voltage, second energy storage means for storing energy between two predetermined levels, a first path including a serially connected resistor and diode connected between said source and said second energy storage means to pass current only in response to said voltage having a rectangular waveform, a second path including a serially connected resistor and diode connected between said first energy storage means and said second energy storage means to pass current only in response to said first energy storage means voltage having a polarity opposite to said source voltage, and means making available the potential appearing across said second energy storage means as a result of the energy stored therein.

2. A waveforming circuit comprising an input terminal, an output terminal, a point of reference potential, first energy storage means connected between said input terminal and said point of reference potential and responsive to a potential having a rectangular waveform with leading and trailing edges to produce at said trailing edge a potential having a polarity opposite to said rectangular waveform potential, second energy storage means connected between said output terminal and said point of reference potential for storing energy between two predetermined levels, a first path including a serially connected resistor and diode connected between said input terminal and said output terminal to pass current only in response to said rectangular waveform potential, and a second path including a serially connected resistor and diode connected between said first energy storage means and said output terminal to pass current only in response to said potential produced by said second energy storage means.

3. A waveforming circuit comprising a first capacitor, means connected in parallel with said first capacitor to limit its charge so that the voltage produced as a result thereof does not exceed a first potential level when charged in a first polarity sense and a second potential level when charged in a second polarity sense, a source producing rectangular pulses of voltage having amplitudes exceeding said first potential level, a first path connected between said source and said capacitor to charge said first capacitor in said first polarity sense in response to said rectangular pulses of voltages, a second capacitor, a diode, means connecting said second capacitor and said diode in series across said source to charge said second capacitor in response to said rectangular pulses of voltage, a second path connected between said first capacitor and the junction between said second capacitor and said diode to charge said first capacitor in response to the voltage appearing across said second capacitor at the termination of each of said rectangular pulses of voltage, and means making available the voltage appearing across said first capacitor.

4. A waveforming circuit in accordance with claim 3 in which said means connected in parallel with said first capacitor comprises a Zener diode.

5. A waveforming circuit comprising an input terminal, an output terminal, a point of reference potential, a first capacitor, a first Zener diode, means connecting said first capacitor and said first Zener diode in parallel between said point of reference potential and said output terminal, a first path including a resistor and a first conventional diode connected in series between said input terminal and said output terminal, a second path including a resistor, a second conventional diode, a second Zener diode, and a second capacitor all connected in series between said input terminal and said output terminal with said second capacitor at the end of the serial connected combination which is connected to said input terminal, one of said first and second conventional diodes being poled to conduct current toward said input terminal and the other being poled to conduct current away from said input terminal, said second Zener diode being poled oppositely with respect to said second diode, and a third path including a resistor and a third conventional diode connected in series between said point of reference potential and the terminal of said second capacitor which is more remote from said input terminal with said third conventional diode being poled in the same sense with respect to said input terminal as said second conventional diode.

References Cited by the Examiner

UNITED STATES PATENTS

| | | | |
|---|---|---|---|
| 2,552,348 | 5/1951 | Sharpero et al. | 333—20 |
| 3,125,694 | 3/1964 | Palthe | 307—88.5 |

FOREIGN PATENTS

| | | |
|---|---|---|
| 741,407 | 11/1952 | Great Britain. |

ARTHUR GAUSS, *Primary Examiner.*

B. P. DAVIS, *Assistant Examiner.*